Aug. 24, 1926. 1,597,564
F. E. ARNDT
ENGINE UNIT SUPPORTING MEANS FOR TRACTORS
Filed July 16, 1925
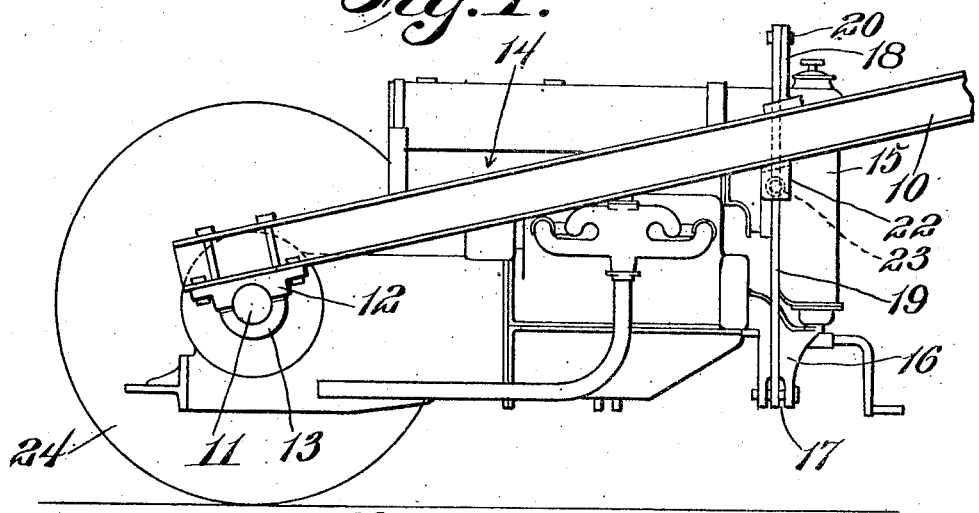
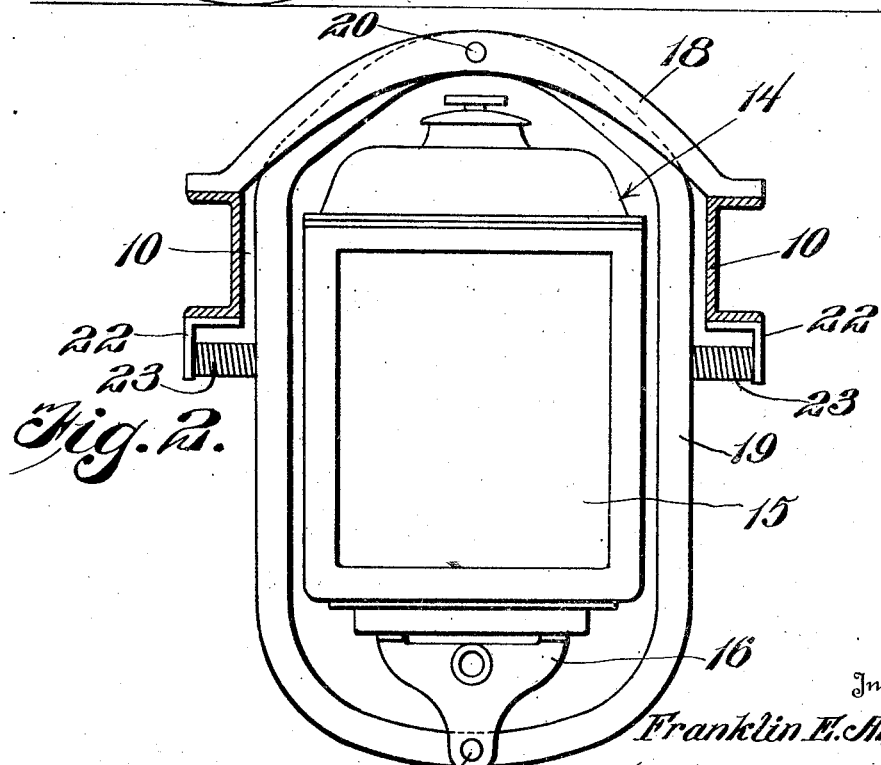
Inventor
Franklin E. Arndt
By Frederick S. Hill
Attorney Patented Aug. 24, 1926.

1,597,564

UNITED STATES PATENT OFFICE.

FRANKLIN E. ARNDT, OF GALION, OHIO, ASSIGNOR TO THE GALION IRON WORKS & MFG. CO., OF GALION, OHIO, A CORPORATION OF OHIO.

ENGINE-UNIT-SUPPORTING MEANS FOR TRACTORS.

Application filed July 16, 1925. Serial No. 44,025.

This invention relates to tractors, and particularly to means for supporting a power unit on the tractor.

Grading and other like tractors are submitted to very rough usage and this is true particularly of graders where the rear or front wheels on one side are liable to be higher than the wheels on the other side, or the front wheels may be running on a horizontal plane while the rear wheels are transversely tilted.

In graders of this character the engine is mounted upon the frame of the tractor and is twisted by the torque to which the frame is subjected, and the general object of the invention is to provide means for so mounting the engine unit that it will be supported on what may be termed a three-point bearing which will permit of the supporting frame of the tractor being twisted to some extent while the engine itself is to some extent yieldingly supported in this vertical plane or against this twisting movement.

A further object is to provide an engine supporting means which includes a stirrup pivotally supported on the frame of the tractor for swinging movement and pivotally supporting the forward end of the engine unit, and provide means yieldingly resisting lateral swinging movement of this stirrup and, therefore, of the forward end of the engine.

A still further object is to provide in that type of grader having arched supporting bars which extend from the forward to the rear wheels, a bar extending across the supporting bars and resting at its ends thereon, and a stirrup which is swingingly connected to said supporting bar and at its middle depends between the frame bars and which at its lower end extends beneath the forward end of the engine and is pivotally connected thereto, this stirrup being yieldingly held from lateral movement by springs.

My invention is illustrated in the accompanying drawing, wherein:—

Figure 1 is a side elevation of the rear end of a tractor grader scraper showing the engine applied thereto and showing my improved means for supporting the engine;

Figure 2 is a transverse section through the frame of the grader looking toward the engine and front supporting means.

Referring to this drawing, it will be seen that I have illustrated my invention as applied to a road grader of that type in which the main frame of the grader consists of two longitudinally extending, upwardly curved channel irons, designated 10. These channel irons at their forward ends are supported upon the rear driving axle 11 by means of bearings 12 and the usual caps 13. I have not attempted to illustrate the details of the grader itself nor the details of the frame construction, it being understood, of course, that suitable braces are used between the channel irons to hold these channel irons in proper spaced relation and that in graders of this character there are mold boards supported for oscillatory movement in a horizontal plane, there is means for manually shifting the mold board, means for manually raising and lowering the mold board, means for steering the machine, and an operator's station.

The engine unit which I have illustrated is what is known as a Fordson engine and is designated generally 14, the radiator being designated 15. At the lower end of the radiator of this unit there is provided, as usual, the downwardly extending casting 16 which is formed with a transversely extending recess 17 defining the two laterally disposed, perforated ears.

For the purpose of supporting the forward end of the engine unit, I provide a transverse bar 18, which at its ends is riveted, bolted or otherwise attached to the flanges of the channel irons 10 and which arches upwardly and transversely over the space between the channel irons. Pivoted to this bar is a stirrup which, as illustrated, consists of an approximately elliptical member 19 which at its upper end is pivoted to the bar 18 by means of the pivot bolt, pin or other like element 20. The lower end of the stirrup 19 extends through the recess 17 and is pivoted thereto and pivoted to the ears on either side of this recess by means of the bolt 21. The forward end of the engine unit is, therefore, suspended in a stirrup which can swing laterally from side to side. This swinging movement of the stirrup is impeded by springs 23 which bear against the stirrup 19 on each side thereof and slightly above the middle thereof and at their outer ends bear against the depending flanges of angle irons 22 which are riveted or otherwise attached to the lower flanges of the channel irons 10.

The rear end of the engine unit carries upon it the transversely extending shaft 11, as before described, which constitutes the drive shaft of the engine and to which power is communicated from the engine by the usual differential or other transmission mechanism. This drive shaft is mounted in bearings 12, as before stated, and carries upon its ends the rear or driving wheels 23. The manner in which the engine is connected with the drive wheels and the manner in which this shaft 11 is mounted upon the rear end of the frame forms no part of my invention, my invention residing entirely in the provision of the cross bar 18, the stirrup 19 and the springs 23, except in so far that in the construction illustrated I have provided a three-point bearing for the engine unit, namely the two bearings 12 and the caps 13 at the rear end of the machine and the single bearing formed by the pivot pin 21.

With this construction, it will be seen that the stirrup 19 can swing laterally against the action of the springs 23 which tend to hold the stirrup in a medial position and that the engine unit can pivot upon the stirrup 19. When, therefore, the forward end of the tractor is disposed in one plane and the rear end of the tractor in a different plane as, for instance, where the two wheels at the forward end of the tractor are disposed in a horizontal plane and the two wheels at the rear end of the tractor are disposed on an inclined plane, the twisting action to which the frame bars 10 are subjected will not be transmitted to the engine unit but the engine will be supported in a parallel plane to the rear wheels or substantially so. Thus there will be much less racking of the engine and the engine will be submitted to far less stress than at present.

I claim:—

1. In a tractor, a main frame including two longitudinally extending beams, a cross bar attached to the beams and extending across the same, a stirrup pivoted at its upper end to the cross bar for transverse swinging movement, and an engine unit pivotally mounted at its lower end to said stirrup and entirely supported at one end thereby.

2. The combination with a tractor having a main frame including laterally disposed, longitudinally extending frame beams, an engine unit, means for supporting the forward end of the engine unit comprising a supporting member attached to the main frame and bridging the space between the same, and a stirrup swingingly engaged at its upper end with said supporting member and extending downward to a point below the forward end of the engine unit and there pivotally engaged with the engine unit.

3. The combination with a tractor having a main frame including laterally disposed, longitudinally extending frame beams, an engine unit means for supporting the forward end of the engine unit comprising a supporting member attached to the main frame and bridging the space between the same, and a stirrup swingingly engaged at its upper end with said supporting member and extending downward to a point below the forward end of the engine unit and there pivotally engaged with the engine unit.

4. The combination with a tractor having a main frame including laterally disposed, longitudinally extending frame beams, a transverse drive shaft supporting the rear ends of the frame beams, an engine unit operatively connected to the drive shaft by means for supporting the forward end of the engine unit comprising a supporting member attached to the main frame and bridging the space between the same, a stirrup swingingly engaged with said supporting member and extending downward to a point below the forward end of the engine unit and there pivotally engaged with the engine unit, and means yieldingly resisting lateral movement of the stirrup.

5. The combination with a tractor having a main frame including two longitudinally extending supporting beams, an engine unit, of means for supporting the forward end of the engine unit comprising a transversely extending supporting bar bridging the space between said beams, a loop-shaped stirrup pivotally engaged at its upper end with said supporting bar at its upper end, the lower end of the stirrup engaging and supporting the forward end of the engine unit, and springs operatively supported by the main frame and resisting lateral swinging movement of the stirrup.

6. A tractor having a main frame including longitudinally extending, upwardly arched beams, an engine unit supported between said beams, a transversely extending drive shaft forming part of the engine unit and mounted in bearings in the rear end of the main frame, and means for supporting the forward end of the engine unit comprising a transversely extending bar mounted upon said main frame beams, a loop-shaped stirrup pivoted at its upper end to said bar, the lower end of the stirrup extending beneath the forward end of the engine unit, the forward end of the engine unit having spaced, downwardly extending lugs between which the stirrup passes and with which the stirrup is pivotally engaged, and compression springs operatively supported upon the main frame beams and bearing against opposite sides of the stirrup and resisting lateral swinging movement of the stirrup.

In testimony whereof I affix my signature.

FRANKLIN E. ARNDT.